(12) United States Patent
Yourist

(10) Patent No.: US 7,393,485 B2
(45) Date of Patent: Jul. 1, 2008

(54) METHOD AND APPARATUS FOR CREATING A SCULPTURE ON A CONTAINER

(75) Inventor: Sheldon Yourist, York, PA (US)

(73) Assignee: Graham Packaging Company, L.P., York, PA (US)

(*) Notice: Subject to any disclaimer, the term of this patent is extended or adjusted under 35 U.S.C. 154(b) by 760 days.

(21) Appl. No.: 10/449,087

(22) Filed: Jun. 2, 2003

(65) Prior Publication Data
US 2004/0022887 A1 Feb. 5, 2004

Related U.S. Application Data

(60) Provisional application No. 60/384,166, filed on May 31, 2002.

(51) Int. Cl.
*B29C 33/40* (2006.01)
(52) U.S. Cl. .......... 264/219; 700/98; 700/118; 700/163; 345/419
(58) Field of Classification Search .......... 264/219; 700/98, 118, 163; 345/419
See application file for complete search history.

(56) References Cited

U.S. PATENT DOCUMENTS

| | | | |
|---|---|---|---|
| 4,641,270 A | 2/1987 | Lalloz et al. | |
| 5,175,806 A | 12/1992 | Muskovitz et al. | |
| 5,224,048 A | 6/1993 | Ohba et al. | |
| 5,253,175 A | 10/1993 | Machii et al. | |
| 5,369,736 A | 11/1994 | Kato et al. | |
| 5,448,687 A | 9/1995 | Hoogerhyde et al. | |
| 5,490,080 A | 2/1996 | Jarrige et al. | |
| 5,504,845 A | 4/1996 | Vecchione | |
| 5,543,103 A | 8/1996 | Hogan et al. | |
| 5,761,068 A | 6/1998 | Nakata | |
| 5,841,441 A | 11/1998 | Smith | |
| 5,844,191 A | 12/1998 | Cox | |
| 5,926,388 A | 7/1999 | Kimbrough et al. | |
| 6,177,034 B1 | 1/2001 | Ferrone | |

OTHER PUBLICATIONS

Six page brochure of Delcam plc., "DUCT Cadcam Systems for Design and Manufacture", 1995, unknown month.
International Search Report from PCT/US03/17282 dated Oct. 23, 2003.

*Primary Examiner*—Suzanne E. McDowell
(74) *Attorney, Agent, or Firm*—Knoble Yoshida & Dunleavy, LLC

(57) ABSTRACT

An efficient and cost-effective method of designing and manufacturing a molded container having highly artistic sculptural relief. Computer software is utilized to design a skin shape, create artwork designs, add relief to the artwork designs, and apply the artwork designs to the container skin to develop a desired container. For example, design data is utilized to make molds, such as blow molds, which, in turn are utilized to make containers.

20 Claims, 18 Drawing Sheets

METHOD AND APPARATUS FOR CREATING A SCULPTURE ON A CONTAINER

BACKGROUND OF THE INVENTION

1. Field of the Invention

The present invention relates to creating a sculpture on a container, and more specifically to a method and apparatus for generating and displaying an image, for example, the image of an artistic sculpture, for producing an electrode to be applied to a mold cavity used in making containers.

2. Related Art

Blow-molded plastic containers have become commonplace in packaging beverages, such as juice, and other hot and cold liquid products. Such a container normally has a dome, an annular sidewall extending from a base, and a waist connecting the dome to the sidewall. Typically, the containers have a horizontal cross section which is circular, rectangular or multi-faceted. Blow-molded plastic containers can provide a package with sufficient flexure to compensate for pressure and temperature, while maintaining structural integrity and aesthetic appearance. In addition, the plastic used in the containers is recyclable. However, in order to increase the sales of beverages or other products, there is a need to produce more aesthetically appealing containers.

According to conventional practices, individuals designed sculptures to appear on containers. Accordingly, as shown in FIG. 1, a design is placed on an electrode attached to a rod. The electrode 1 is heated with an electric current and applied to a mold 2 to leave a negative relief impression of the design on mold 2 as shown in FIG. 2. Thereafter, mold 2 is assembled to form a mold cavity. A preform made of plastic is inserted into the mold and the preform is blown in the mold cavity. Subsequently, the container with the impressed design is removed from the mold cavity. However, using this technique, a defective sculpture is often found on the container, and the container is rejected. The defective sculpture appears on the container, because the application of the prior art electrode 1 to the mold is often imprecise. The electrode 1 is pressed too far against the mold leaving unwanted marks on the mold, which appear for example, as unintended frame-like impression marks on the container 3 as shown in FIG. 3. Alternatively, the electrode 1 is not pressed far enough against the mold leaving a poor impression of the design on the container 4 as shown in FIG. 4. As the number of desired sculptures on a container increases, the potential number of sculptural defects increases. Since both of the above-mentioned defects occur due to variances in machine tolerances during the process of impressing the conventional electrode onto the mold, there is a need for a new method for creating sculptures on containers efficiently, quickly, repeatedly, at a low cost, and with minimal defects.

BRIEF SUMMARY OF THE INVENTION

According to an exemplary embodiment of the present invention, a method may be provided in a computer system which may be used for generating an image for producing an electrode. The method may include: generating a virtual sculptural relief; projecting the virtual sculptural relief onto a virtual mold cavity surface to form a virtual sculptural relief on the virtual mold cavity surface, the projected virtual sculptural relief having a profile; removing the virtual mold cavity surface outside the profile of the virtual projected sculptural relief; extending the virtual projected sculptural relief profile to a predetermined plane to form a virtual extension of the virtual projected sculptural relief; and combining the virtual projected sculptural relief with the virtual extension, which together form a virtual image of the electrode.

The method according to an exemplary embodiment of the present invention may further include converting the virtual image into a numerical control language. A material may be machined based on the numerical control language to form the electrode. The material from which the electrode is formed may be graphite, for example.

Removing the virtual mold cavity surface may include triangulating the virtual projected sculptural relief, for example. Extending the virtual projected sculptural relief may include triangulating the virtual extension. The method according to an embodiment of the present invention also may include displaying the combined virtual projected sculptural relief and virtual extension, which together form the image of the electrode. The method also may include displaying the triangulated virtual projected sculptural relief and triangulated virtual extension, which together form the image of the electrode. According to the method of an exemplary embodiment of the present invention, a two-dimensional shape may be generated prior to the step of generating the sculptural relief, and the sculptural relief may be generated based upon the two-dimensional shape.

According to another exemplary embodiment, the present invention may provide a method for forming a sculpture on a container. The method may include: generating a virtual sculptural relief; projecting the virtual sculptural relief onto a virtual mold cavity surface to form a virtual sculptural relief on the virtual mold cavity surface, the projected virtual sculptural relief having a profile; removing the virtual mold cavity surface outside the profile of the virtual projected sculptural relief; extending the virtual projected sculptural relief profile to a predetermined plane to form a virtual extension of the virtual projected sculptural relief; combining the virtual projected sculptural relief with the virtual extension, which together form a virtual image of the electrode; converting the virtual image into a numerical control language; machining a material into an electrode based on the numerical control language; providing a mold having a mold cavity; burning the mold with the electrode; inserting preform into mold cavity; and blowing preform in the mold cavity to form the container having a sculpture. The material from which the electrode is formed may be graphite, for example.

The method step of removing the virtual mold cavity surface may include triangulating the virtual projected sculptural relief. The method step of extending the virtual projected sculptural relief may include triangulating the virtual extension. The method also may include displaying the combined triangulated virtual projected sculptural relief and triangulated virtual extension, which together form the image of the electrode. According to an embodiment of the present invention, a two-dimensional shape may be generated prior to the step of generating the sculptural relief, and may be used as a basis for generating the sculptural relief.

According to yet another exemplary embodiment, the present invention may provide a computer system which may be used for generating an image for producing an electrode. The method may include: input means for providing a virtual sculptural relief; projecting means for projecting the virtual sculptural relief onto a virtual mold cavity surface to form a virtual projected sculptural relief on the virtual mold cavity surface, the projected virtual sculptural relief having a profile; removing means for removing the virtual mold cavity surface outside of the profile of the virtual projected sculptural relief; extending means for extending the virtual projected sculptural relief profile to a predetermined plane to form a virtual extension of the projected sculptural relief; and combining means for combining virtual projected sculptural relief with the virtual extension, which together form the image of the electrode. The computer system also may include display means for displaying the combined virtual projected sculptural relief and virtual extension, which together form the image of the electrode.

According to still another exemplary embodiment, the present invention provides an apparatus for forming a sculpture on a container. The apparatus may include: means for providing a virtual sculptural relief; means for projecting the virtual sculptural relief onto a virtual mold cavity surface to form a virtual projected sculptural relief on a virtual mold cavity surface, the projected virtual sculptural relief having a profile; means for removing the virtual mold cavity surface outside the profile of the virtual projected sculptural relief; extending means for extending the virtual projected sculptural relief profile to a predetermined plane to form a virtual extension of the projected sculptural relief; combining means for combining virtual projected sculptural relief with the virtual extension, which together form the image of the electrode; means for converting image into a numerical control language; means for machining a material into an electrode based on the numerical control language; means for burning a mold with the electrode, wherein the mold has a mold cavity; means for inserting preform into the mold cavity; and means for blowing preform in mold cavity to form container with the sculpture. The apparatus also may include means for displaying the combined virtual projected sculptural relief and virtual extension, which together form the image of the electrode.

According to yet another exemplary embodiment of the present invention, a method for producing an electrode is set forth. The method may include (a) forming a virtual sculptural relief having at least three dimensions, and a perimeter boundary; and (b) creating a virtual electrode from the perimeter boundary of the virtual sculptural relief.

In one exemplary embodiment, step (a) can include (1) generating an image having at least two dimensions; and (2) forming the virtual sculptural relief by adding depth to the image.

In another exemplary embodiment, the method can further include (c) extending the perimeter boundary of the virtual sculptural relief in a third dimension to form a virtual extension. In yet another exemplary embodiment, step (c) can include (1) extending the virtual extension straight back behind the perimeter boundary of the virtual sculptural relief. In another exemplary embodiment, step (c) can include (1) extending the virtual extension in a tapered manner behind the perimeter boundary of the virtual sculptural relief. In one exemplary embodiment, step (c) can include (1) extending the virtual extension so a virtual extension volume is less than or equal to a volume created by extending directly back from the perimeter boundary. In another exemplary embodiment, the step (b) can include (1) creating the virtual electrode from the perimeter boundary of the virtual sculptural relief and the virtual extension.

In another exemplary embodiment, the method can further include (c) converting the virtual electrode into a numerical control language.

In one exemplary embodiment, the method can further include (d) machining a material based on the numerical control language to form an electrode. The material can include graphite.

The present invention can be used in an environment that includes multiple molds, such as, e.g., 10-20 molds. Since multiple molds are used, the present invention can be done repetitively over a series of molds. As will be apparent to those skilled in the art, molds can vary. Mold variance can be attributed to variances in the tooling process, mold shrink, and contraction and expansion of molds. The electrode resulting from the methods of the present invention can advantageously be used to eliminate variance between multiple molds when the method of the present invention is employed to produce an electrode.

DETAILED DESCRIPTION OF THE INVENTION

Figure 1:
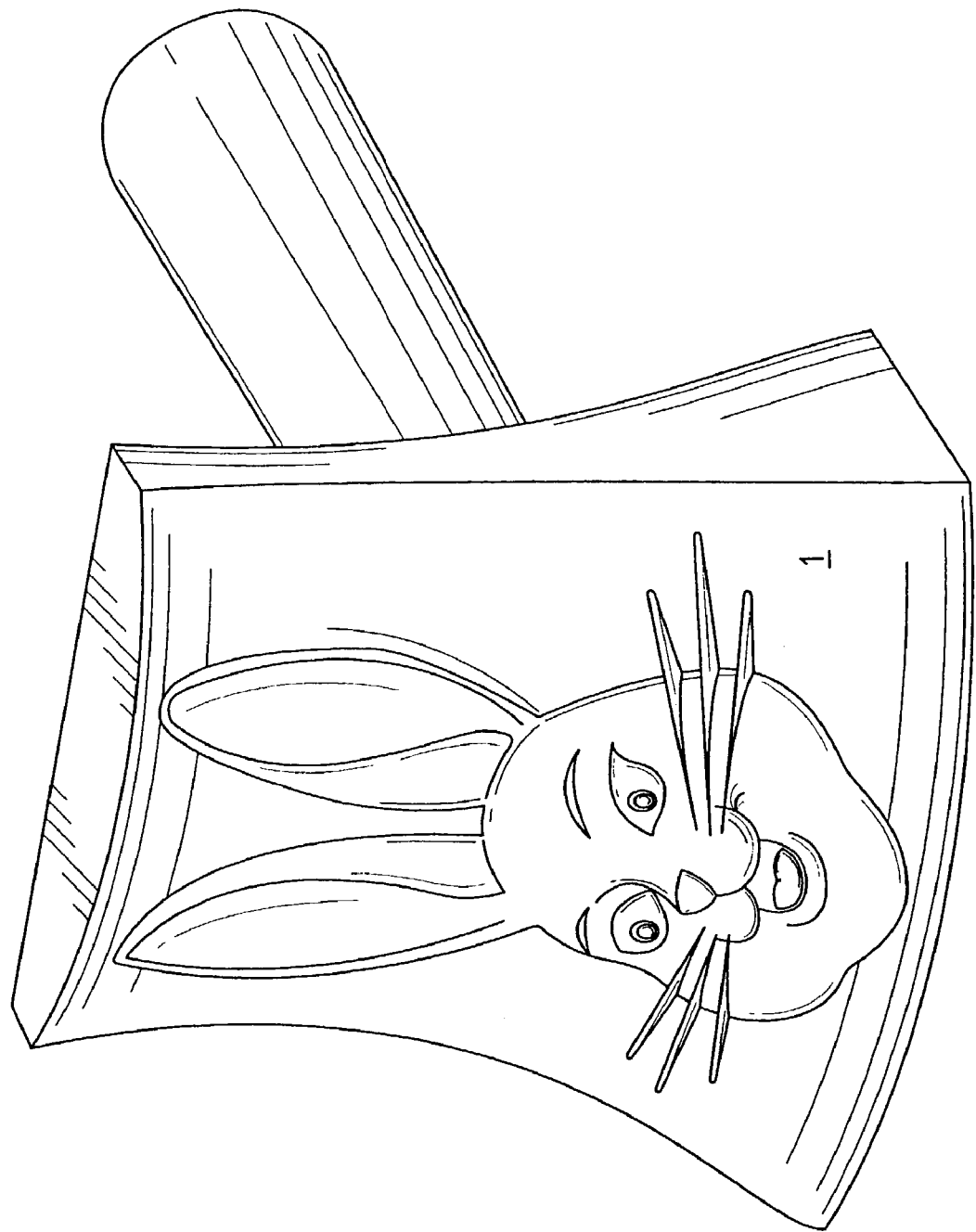
FIG. 1 shows a rod attached to an electrode created in accordance with a conventional method.
Figure 2:
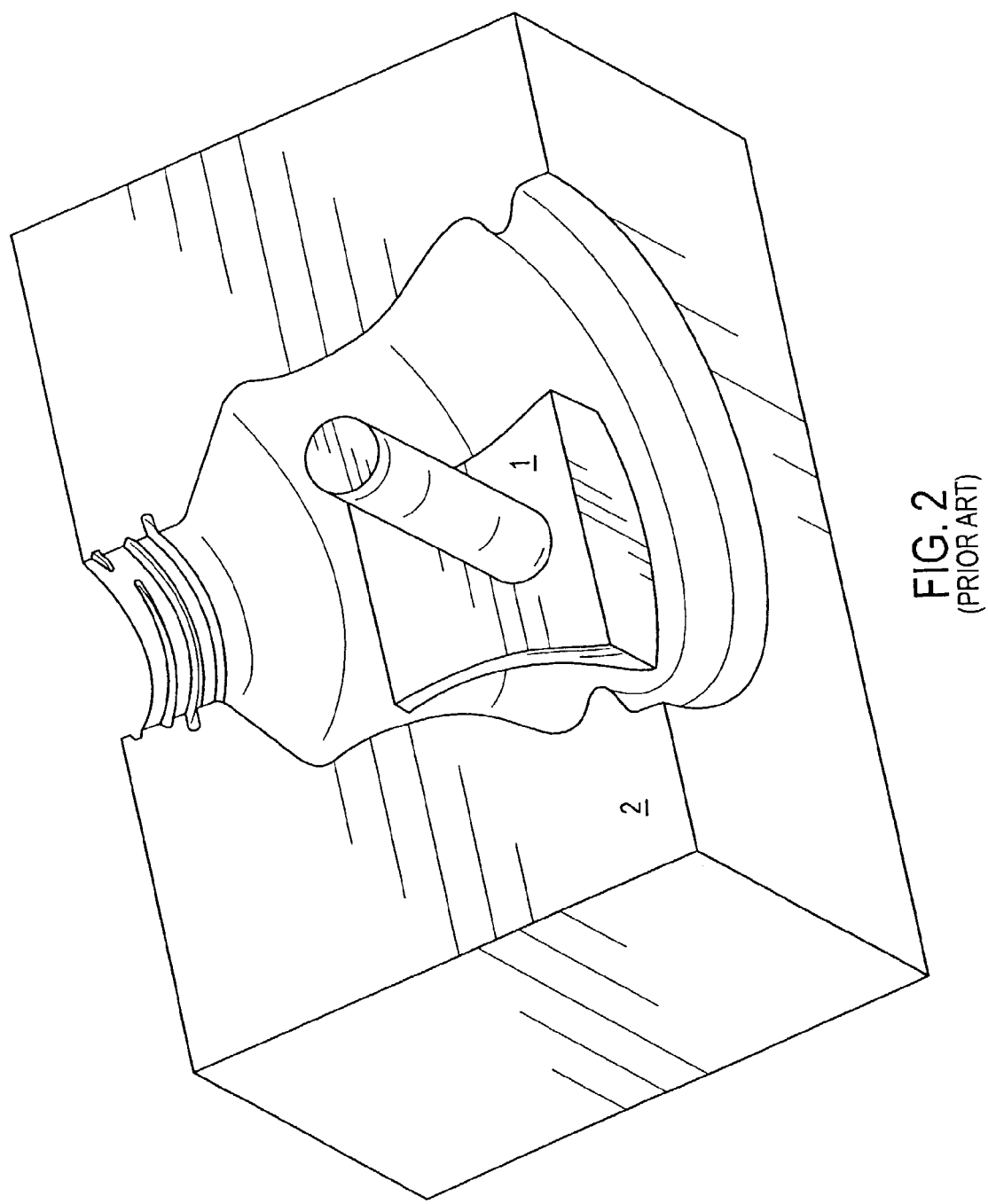
FIG. 2 shows applying a conventional electrode to a mold to impress an image onto the mold.
Figure 3:
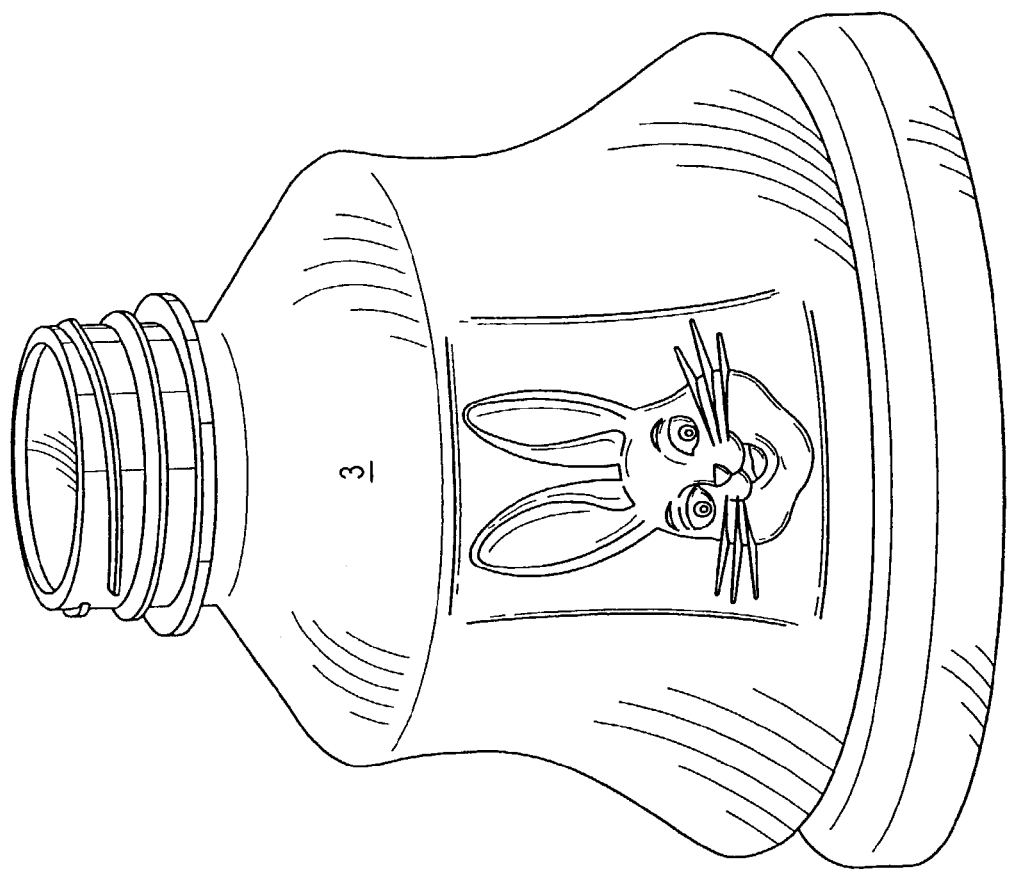
FIG. 3 shows a defective container made using a mold produced by a conventional method.
Figure 4:
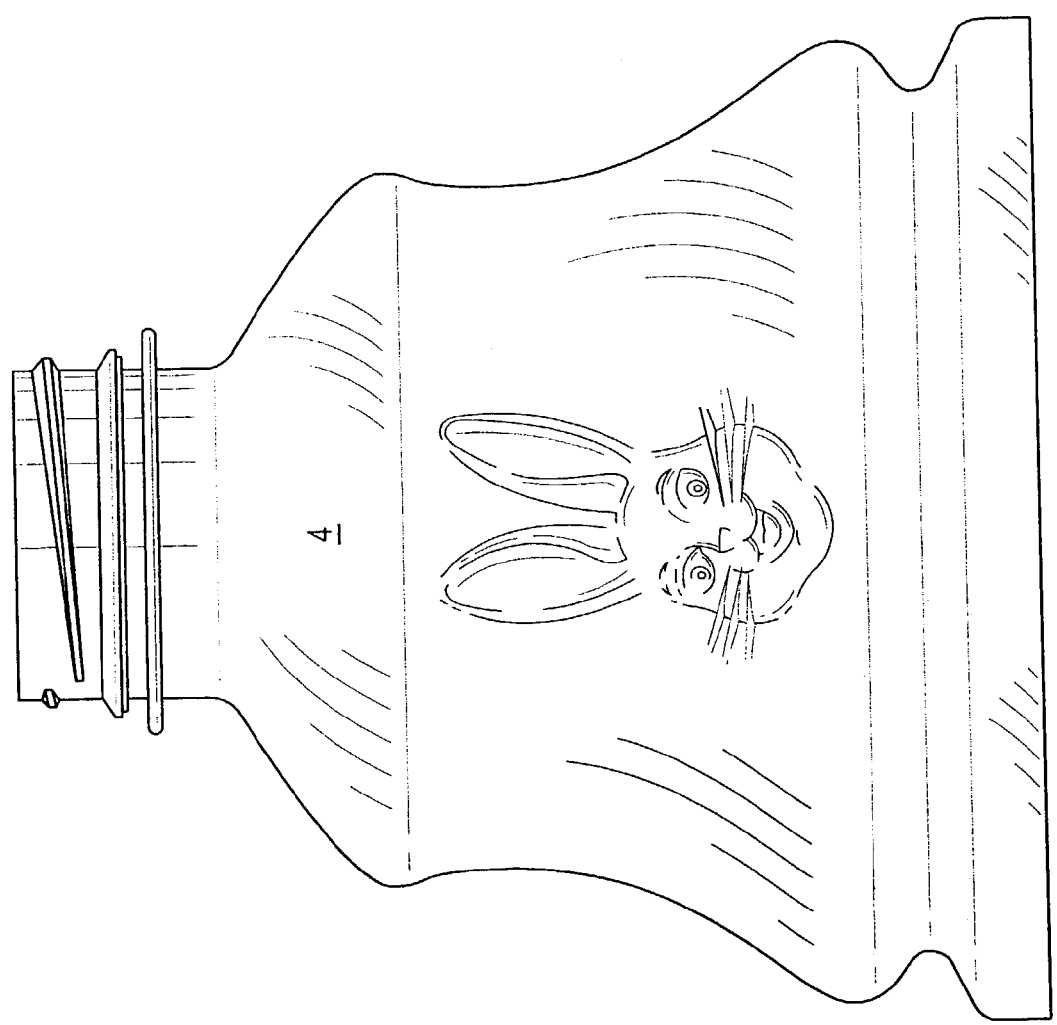
FIG. 4 shows another defective container made using a mold produced by a conventional method.
Figure 5:
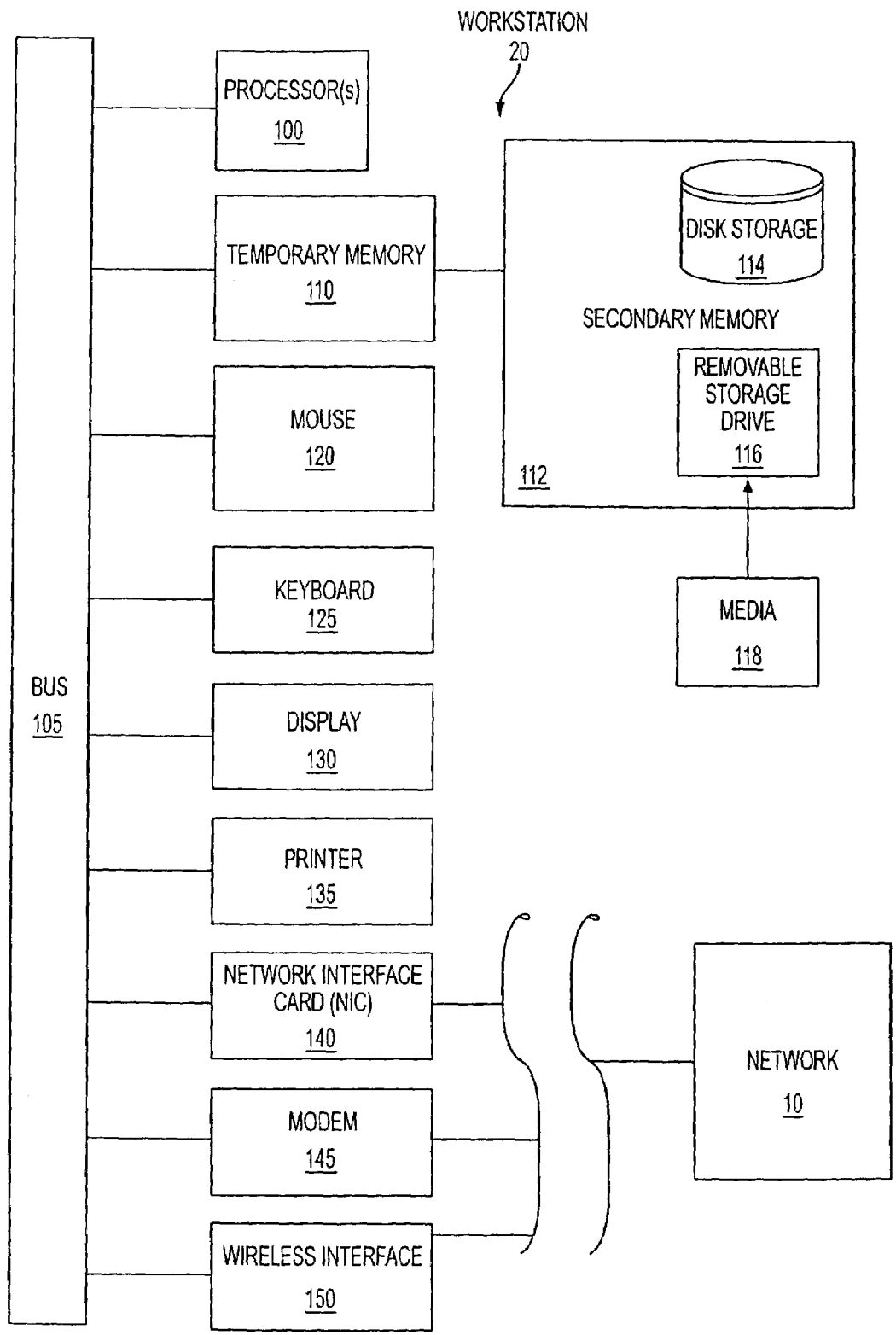
FIG. 5 is an example of a workstation utilized to implement an exemplary embodiment of the present invention.

FIG. 5 shows a block diagram of a workstation 20 coupled to a network 10, which provides an example of a computer system, that may be used to implement the invention. The network 10 and the components interfacing with a network are optional parts of the computer system. Workstation 20 includes one or more processors 100 coupled to a bus 105. The bus 105 can be coupled to any of various subsystems including, for example: a temporary memory 110; a secondary memory 112 such as, a disk storage 114, and/or a removable storage drive 116 into which media 118 can be placed including, e.g., a diskette, a compact diskette (e.g. CD ROM) or the like; an input device such as a mouse 120, or a keyboard 125; an output device such as a display 130 or printer 135; and input/output (I/O) devices to a network 10, for example an network interface card (NIC) 140, such as an Ethernet, Token Ring, Smart or Asynchronous Transfer Mode (ATM) card. Other input/output devices may include a modem 145, or other input/output device such as, a wireless interface 150 (e.g. a wireless transceiver). It will be apparent to those skilled in the relevant art that the above-described workstation 20 has been provided as an example and is not intended to limit the breadth of the invention in any way. The software performing the method steps may be stored on any storage medium, which can be accessed by the workstation 20.

All of the images shown in all of the figures can be displayed on the display 130, it is understood that displaying each and every step is not necessary. It is further understood that the sculpture shown in the figures is only intended as an example. The designer may design any sculpture. Moreover, the designed electrode may be applied to any mold for any mold process. A dome shaped mold used in a blow-molding process is just one embodiment.

Figure 10:
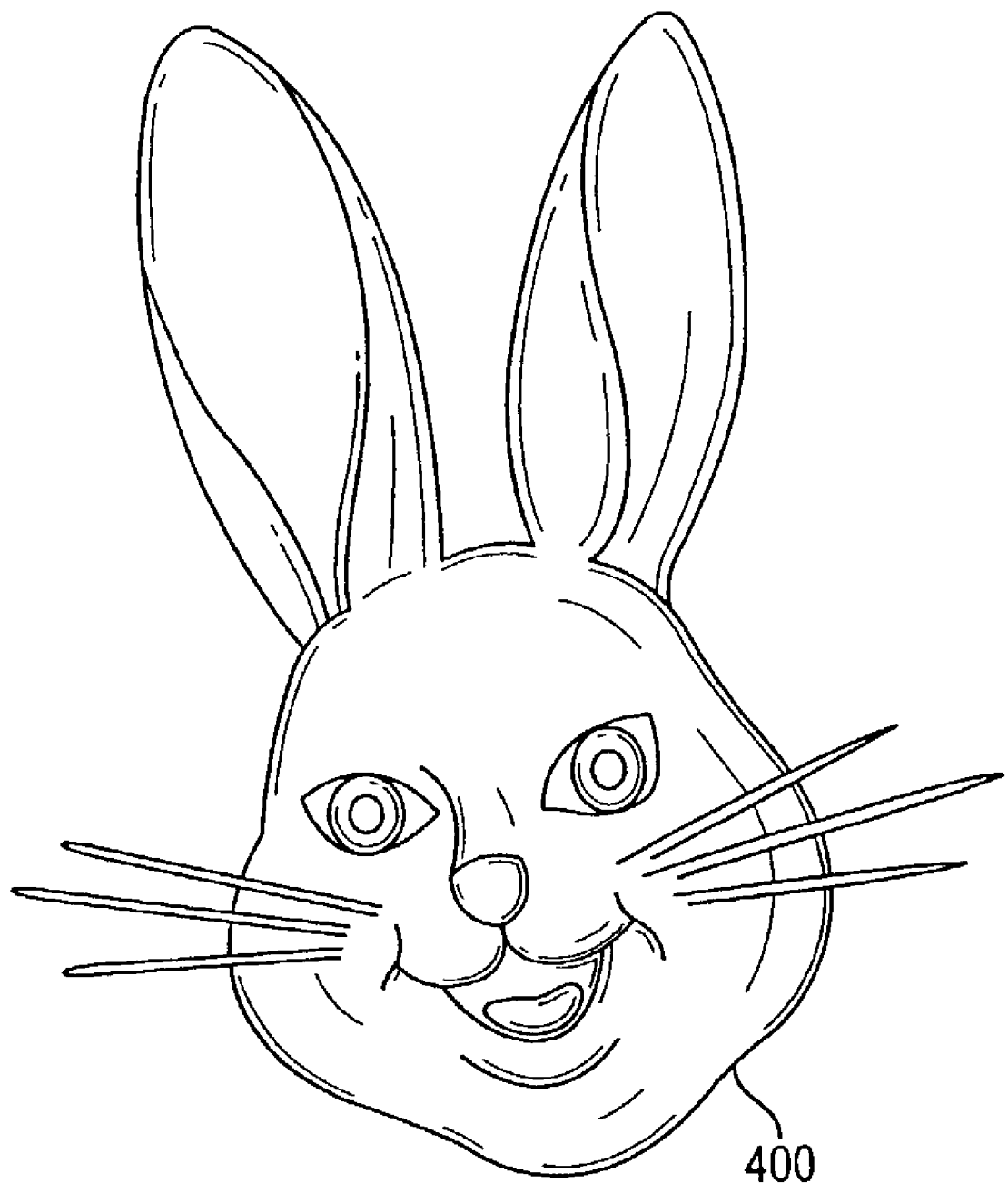
FIG. 10 is an example of a two-dimensional image which may be used to form a sculptural relief according to an exemplary embodiment of the present invention.
Figure 11:
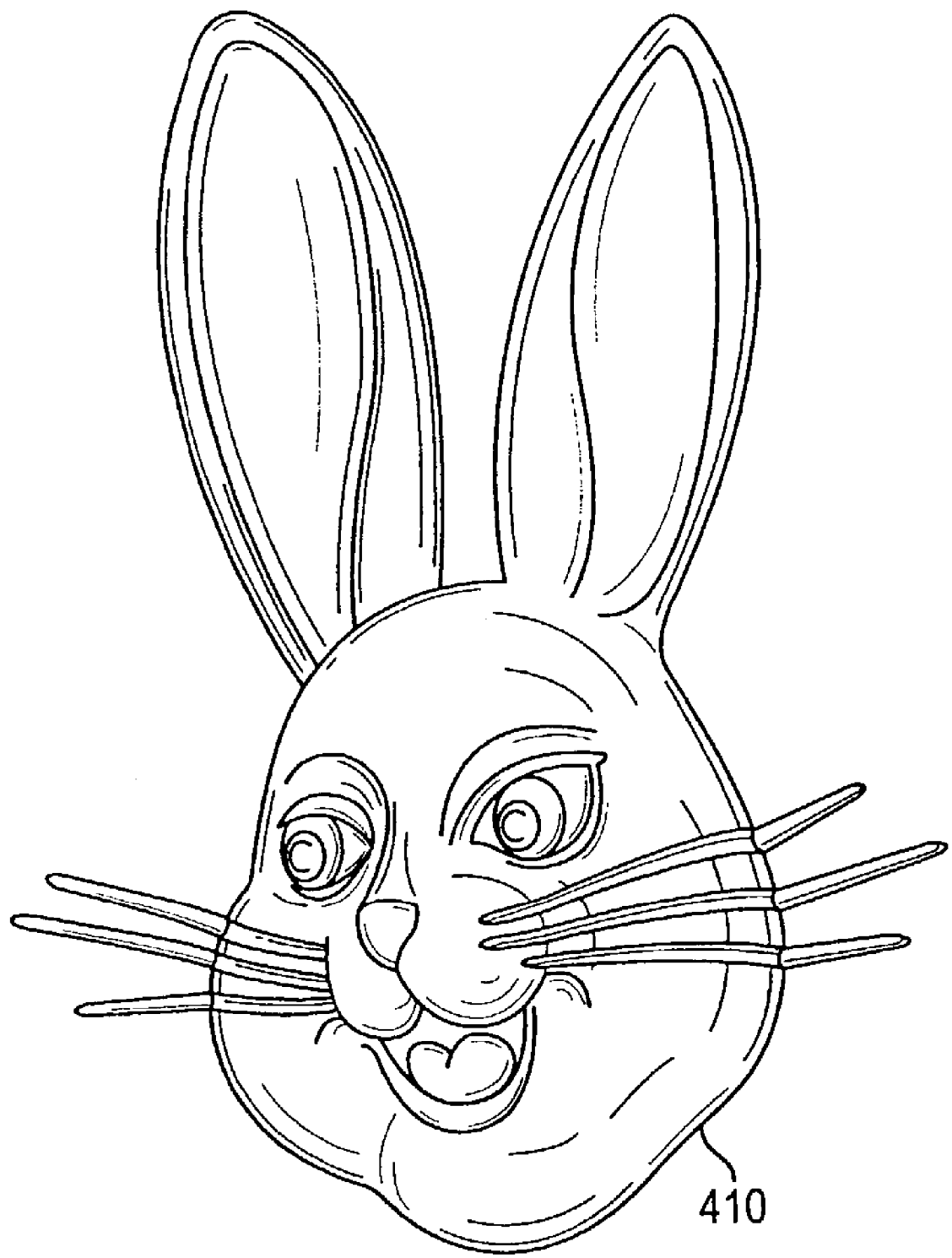
FIG. 11 is an example of a sculptural relief according to an exemplary embodiment of the present invention.

FIGS. 6-9 are a series of flow charts showing an exemplary embodiment of the present invention. The results of the method steps in the flow charts of FIGS. 6-9 are illustrated in FIGS. 10-17. A designer may begin the design of an electrode by generating a two-dimensional image or shape of the artwork, which he or she wishes to appear on the container (step 200). The designer may then form a sculptural relief image (205). Steps 200 and 205 may be implemented using any computer aided design (CAD) or computer aided manufacturing (CAM) application such as, e.g., a commercial software package such as, e.g., ARTCAM® available from Delcam plc of Birmingham, England. A sculptural relief is a three-dimensional image formed in an otherwise planer surface. A sculptural relief may be either positive (protruding from the plane toward an observer) or negative (receding from the plane relative to the observer). FIG. 10 is an example of a two-dimensional image 400 from which a positive sculptural relief 410 as shown in FIG. 11 can be formed. Alternatively, the sculptural relief image 410 may be created without referencing a two-dimensional image 400 (step 205). The sculptural relief is stored in memory as digital data. In an alternative embodiment of the present invention, as will be apparent to those skilled in the art, any common CAD/CAM software application can be used to create an extension from a boundary of a virtual sculptural relief, according to the present invention. See the discussion below with reference to FIG. 18.

Figure 12:
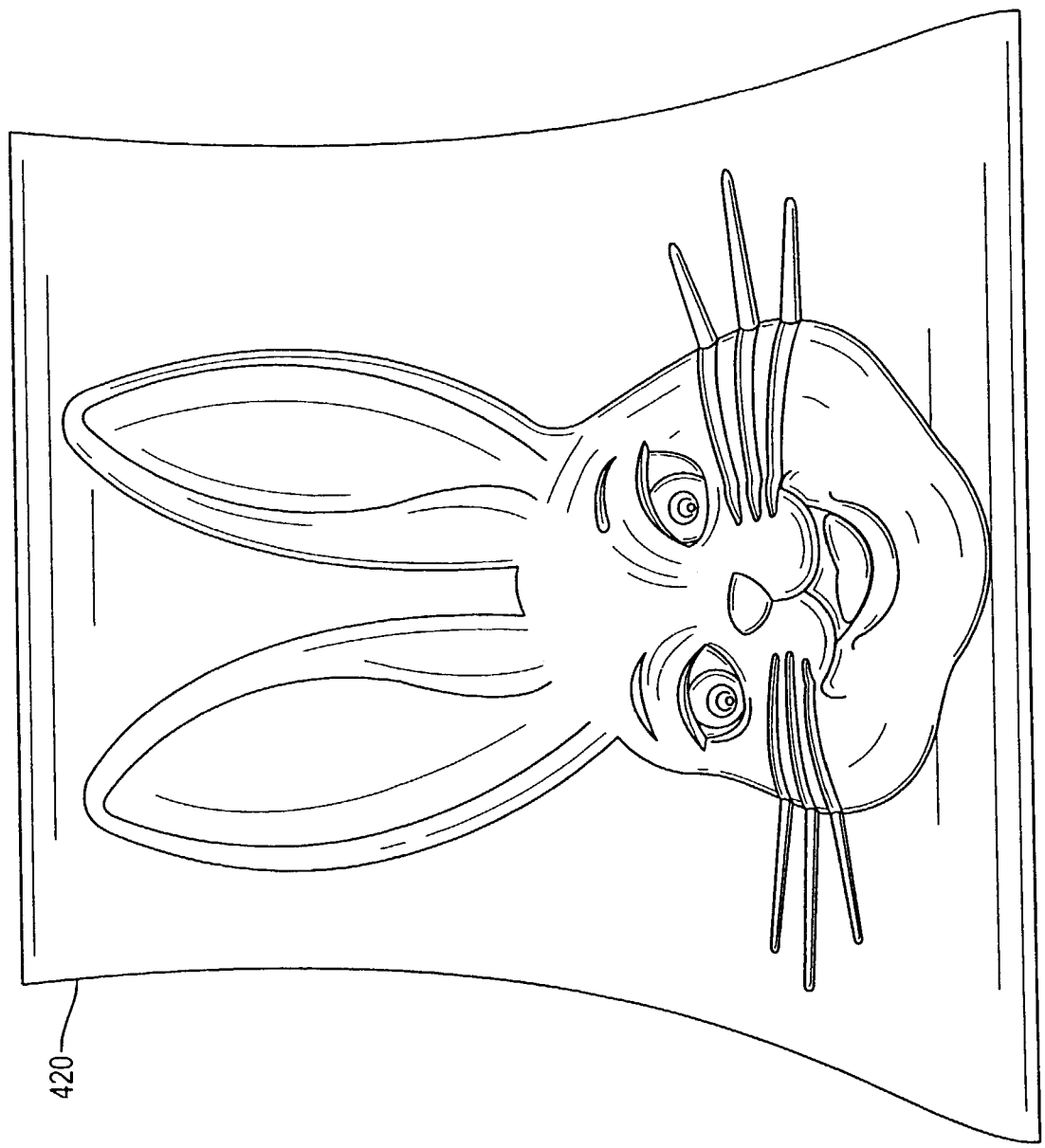
FIG. 12 shows the sculptural relief projected onto a virtual mold cavity surface according to an exemplary embodiment of the present invention.

After the sculptural relief image is formed (step 205), the sculptural relief image can be projected onto a simulated mold cavity surface (step 210). For the purposes of this description, simulated mold cavity surface means a virtual surface created on the display of the workstation which has a shape corresponding to the shape of the mold cavity surface on which the sculptural relief is to appear. FIG. 12 shows the projected sculptural relief image 420. Although the simulated mold cavity surface shown in FIG. 12 is based on a bell shaped mold, the simulated mold cavity surface could be any shape onto which the sculptural relief is desired. After the sculptural relief is projected onto the simulated mold cavity surface (step 210), the sculptural relief can be triangulated (step 215) to differentiate the surface of the sculptural relief projected onto the simulated mold cavity from the simulated mold cavity surface, which does not contain the projected surface of the sculptural relief. In effect, a digital data set is formed defining points of the sculptural relief relative to points defining the surrounding simulated mold cavity surface. Triangulation of shapes or images is a well known process, which involves using a plurality of triangles in a coordinate system to define a shape or image. Any other method for ascertaining the surface of the sculptural relief on the simulated mold cavity can be used.

Figure 13:
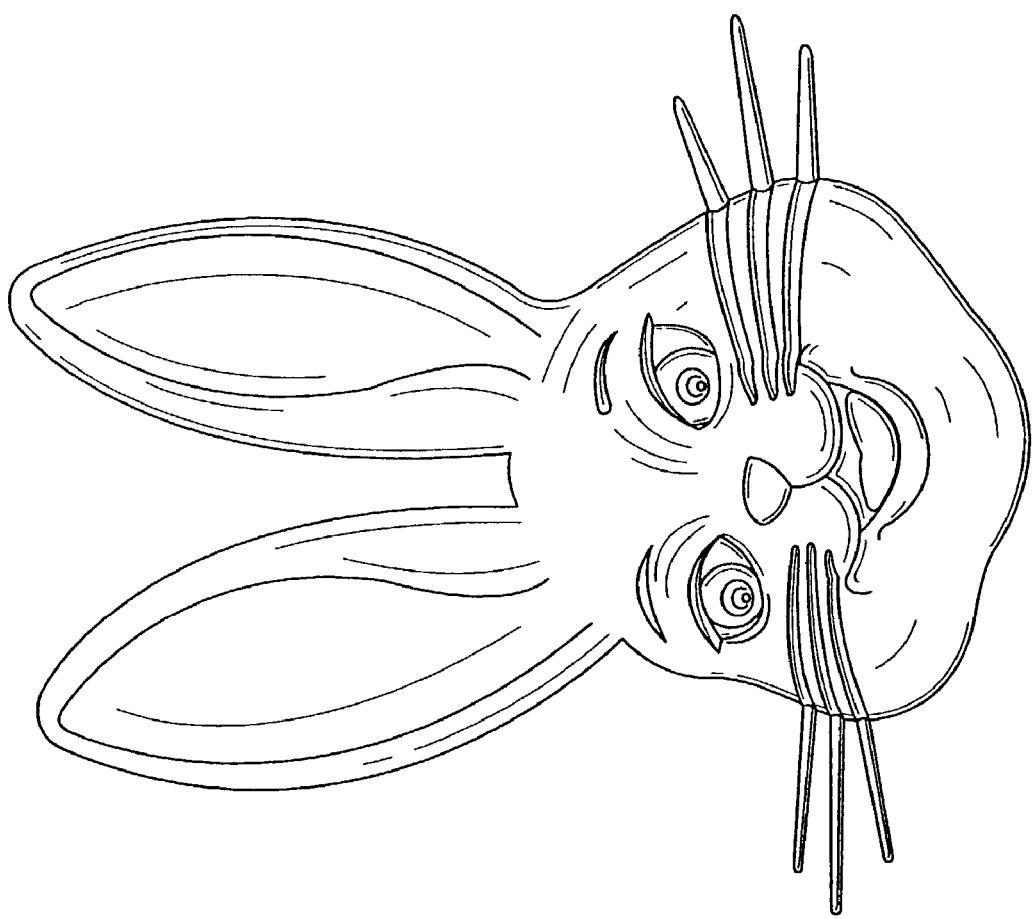
FIG. 13 shows a trimmed sculptural relief according to an exemplary embodiment of the present invention.
Figure 14:
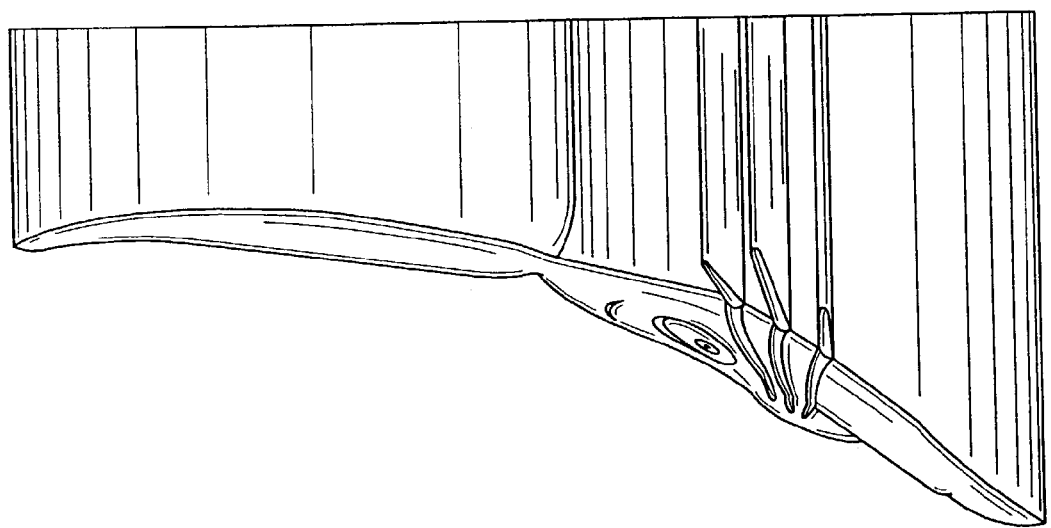
FIGS. 14-15 show an electrode according to an exemplary embodiment of the present invention.
Figure 15:
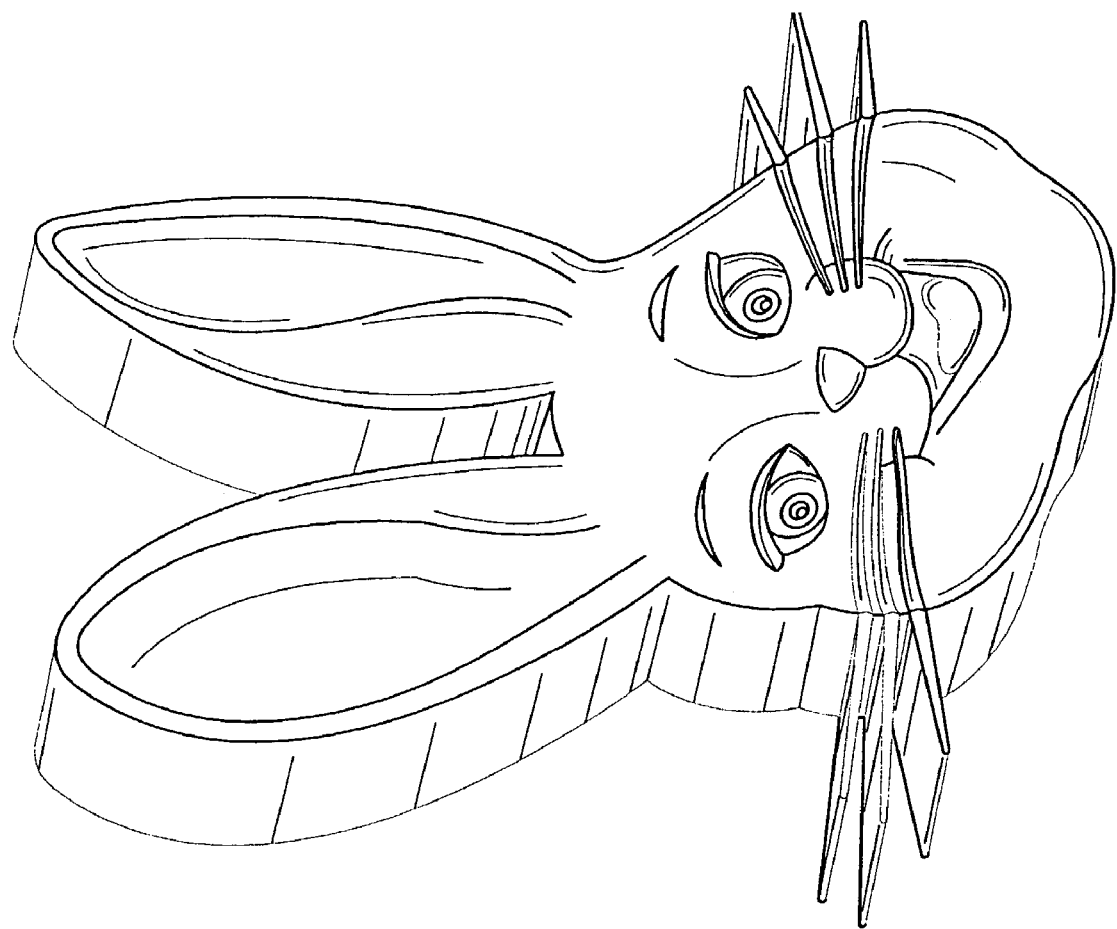

After the surface of the projected sculptural relief on the simulated mold cavity is ascertained, the simulated mold cavity surface outside boundary of the projected sculptural relief image are trimmed away or removed (step 220) as shown in FIG. 13. The outer boundary of projected sculptural relief image shown in FIG. 13 determines the profile or outline of the projected sculptural relief image (step 230). Steps 210 through 230 may be performed by any commercially available CAD/CAM software packages such as, e.g., COPYCAD® available from Delcam plc of Birmingham, England. Subsequently, the profile of the projected sculptural relief image is extended (235) on the negative relief side of the sculptural relief image as shown in FIGS. 14-15 to define a virtual image of the back and sides of the electrode. Step 235 may be performed by a commercially available software packages such as, e.g., POWERSHAPE® available from Delcam plc of Birmingham, England. The extension image can be triangulated (step 240) to ascertain points defining the area of the extension. Any method for ascertaining the area of the extension can be used, as will be apparent to those skilled in the art. In one exemplary embodiment, a virtual sculptural relief can be extended perpendicular to the height and width of the relief, backward along the depth of the relief. The extension can be straight back. Alternatively, the virtual sculptural relief can be extended back in a tapered fashion at, e.g., less than the perimeter boundary of the virtual sculptural relief. For, example, the extension could taper inward toward substantially a single point perspective, creating, e.g., a cone-like cylindrical extension. Various alternative extensions can be used within the spirit and scope of the invention so as to achieve the desired results of creating an electrode that eliminates effects of variances of molds when using a series of molds, due to such factors as contraction and expansion of molds, and variances of the tooling process.

The triangulated sculptural relief image and the triangulated extension image can be combined or merged to provide the virtual image or electronic equivalent of the electrode (step 245). The electronic equivalent is digital data stored in memory, and may be displayed on a display screen as shown in FIGS. 14-15. It is understood that steps 200-245 may be performed by a designer on a workstation such as the workstation shown in FIG. 5. Steps 240 through 245 may be performed by commercially available CAD/CAM software packages such as, e.g., COPYCAD® available from, Delcam plc of Birmingham, England.

Figure 16:
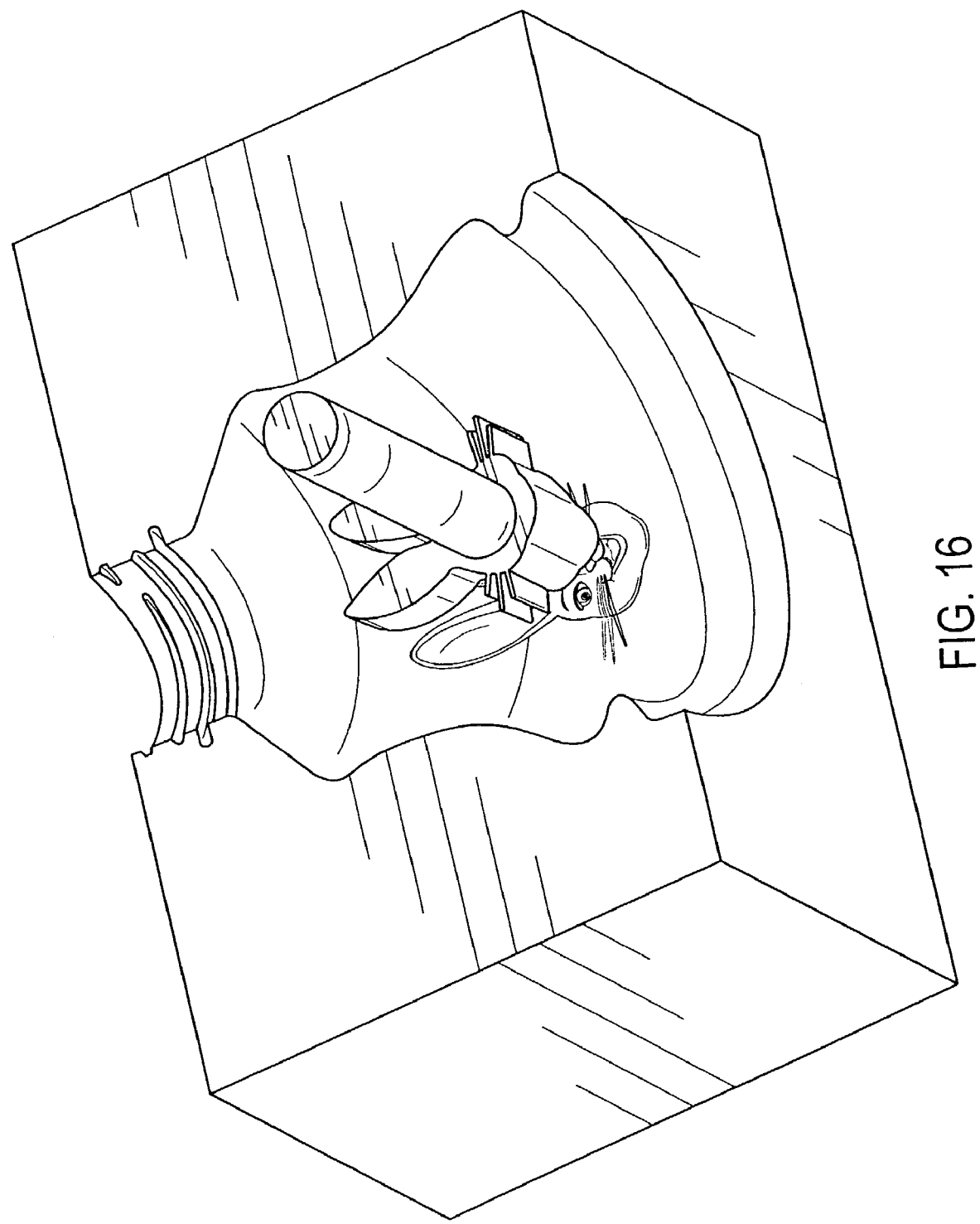
FIG. 16 shows an electrode attached to a rod and an image impressed upon a mold according to an exemplary embodiment of the present invention.
Figure 17:
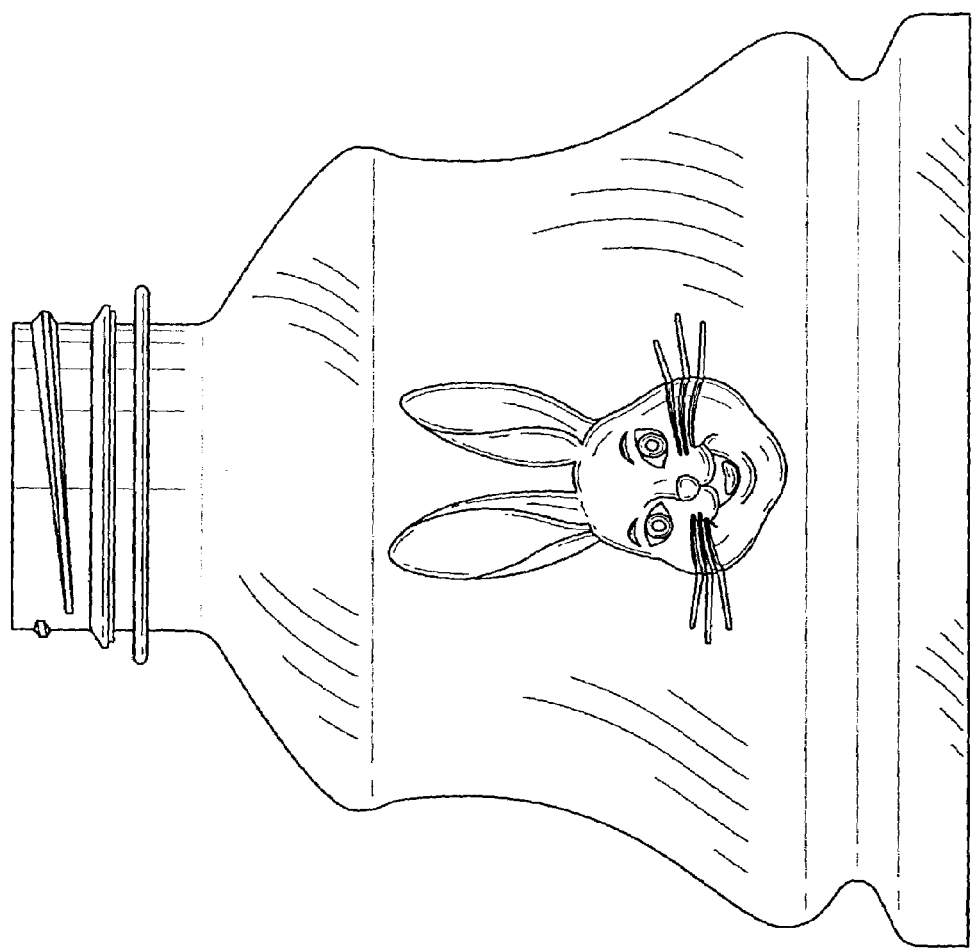
FIG. 17 shows a blow-molded container according to an exemplary embodiment of the present invention.

A conventional tooling program reads the digital data defining the electronic equivalent of the electrode from memory and converts the digital data into numerical control language steps (step 250-255). The digital data may be converted into a numerical control language at the same workstation as steps 200-245 were performed or a different workstation containing the conventional software for converting the digital data to a numerical control language. A mill may be used to machine an electrode in the form of a positive sculptural relief based upon the numerical control language from a material such as graphite (step 260). The electrode is attached to an electric discharge machine (EDM) by a rod (step 265). In this embodiment, two cavity halves are aligned with the electrode (step 270). Alternatively, the mold may be divided into more than two halves. After the electrode is aligned with the mold, the mold can be submerged in oil (step 275) and at least one piece of the mold cavity is burned with an electrode (step 280) as shown in FIG. 16. However, the same electrode may be used several times to burn several sculptures in the mold. Moreover, steps 200-260 may be repeated to create several different electrodes with different sculptures to burn into the molds.

After the mold is burned by the electrode, the mold is cleaned (step 285) and the mold is assembled to form a mold cavity (step 290). In a blow-molding process, a container is blown. Blow-molding processes that can utilize molds having relief images formed therein include, for example, extrusion blow-molding, injection blow-molding, and stretch blow-molding. These blow-molding processes are well known in the art. For example, in a stretch blow-molding process, a preform is inserted into the mold cavity (step 295) and a container is blown (step 300). The container with at least one highly artistic sculpture is removed from the mold (step 305), and the mold may be used again to create additional containers to rapidly and inexpensively produce containers having highly artistic sculptures appealing to consumers. Similar steps can be included in other blow-molding processes.

Figure 6:
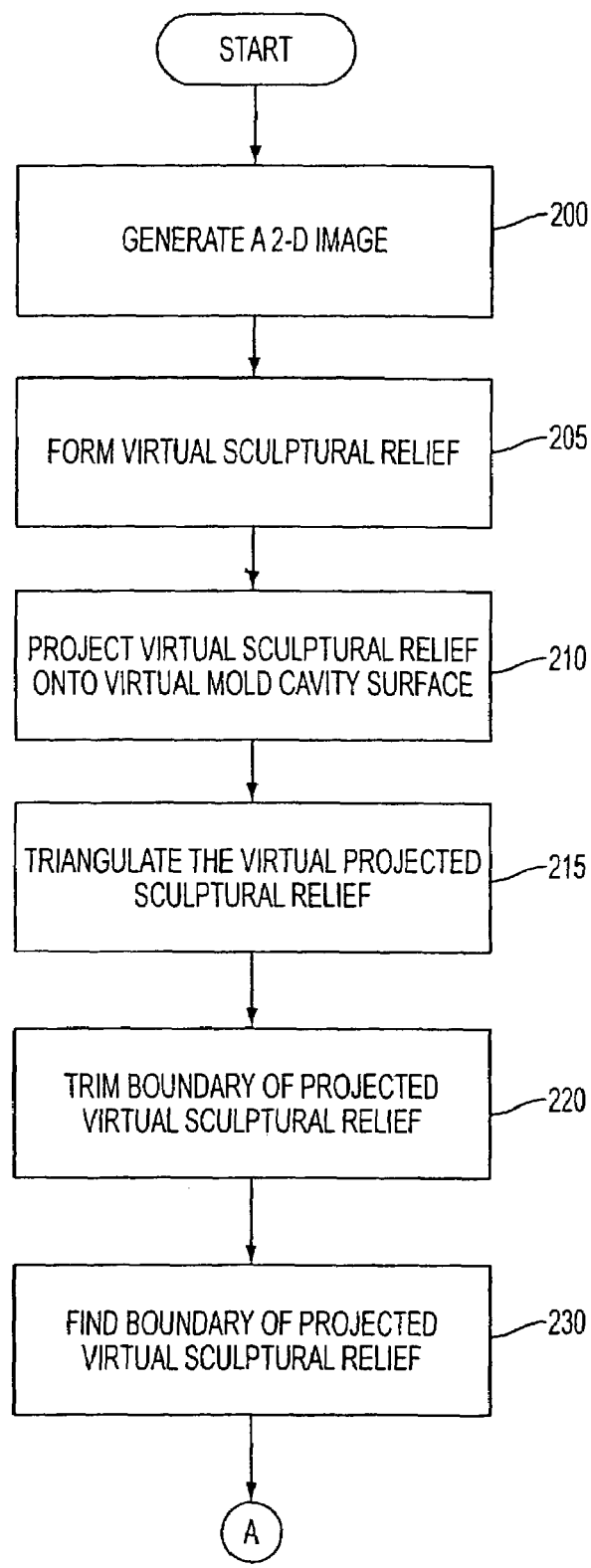
FIGS. 6-9 are flow charts showing exemplary embodiments of the present invention.
Figure 7:
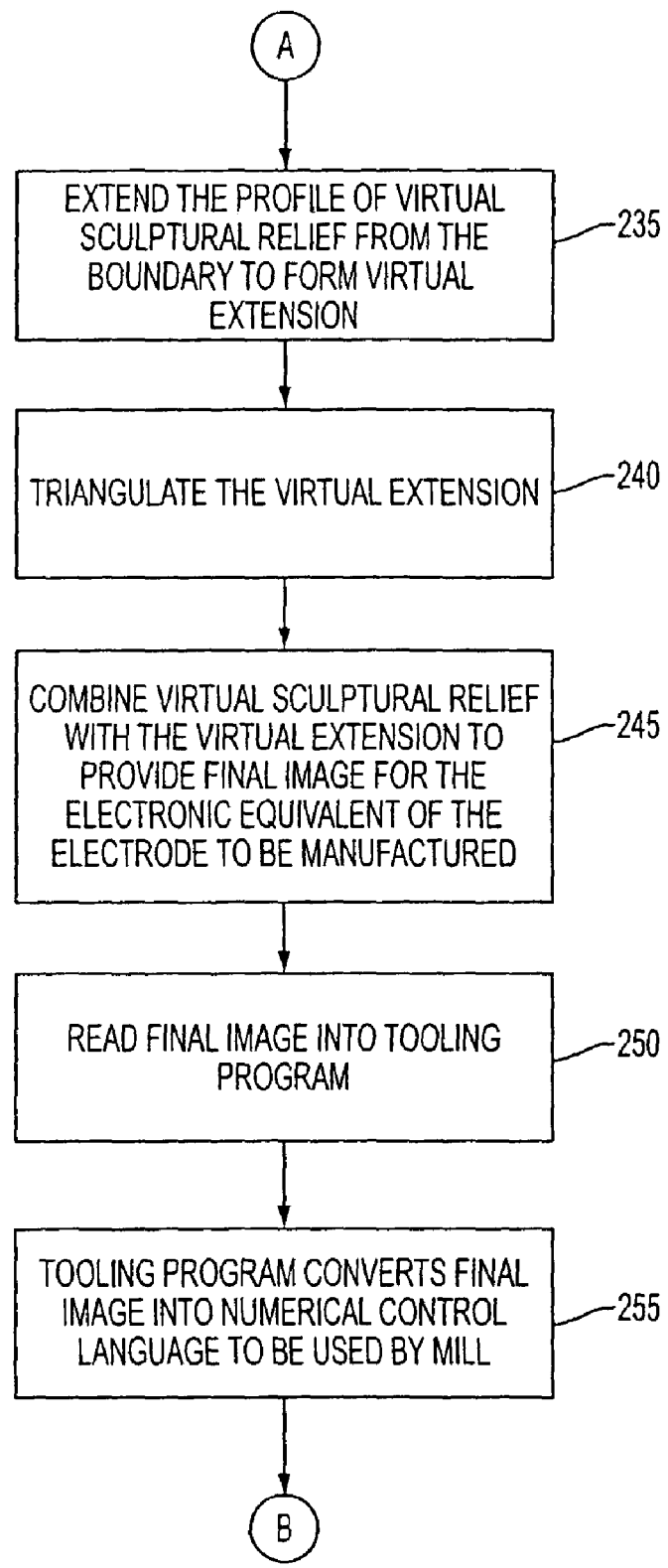
Figure 8:
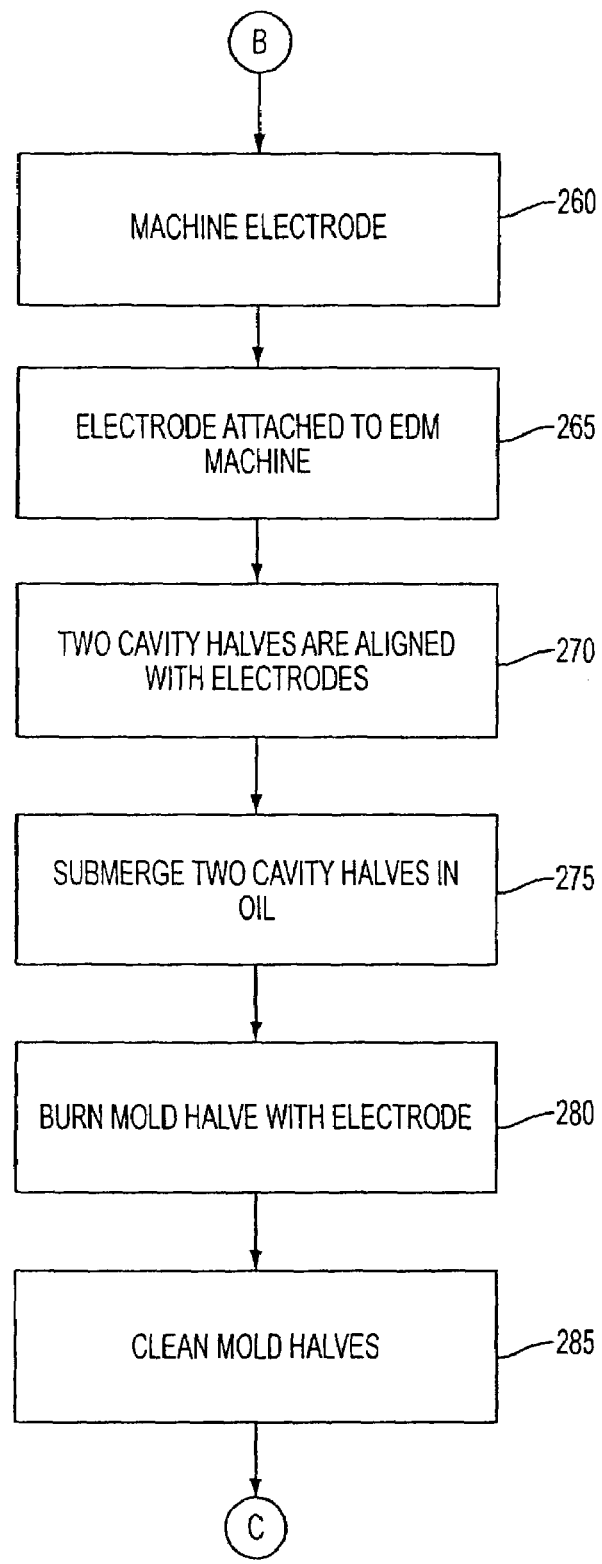
Figure 9:
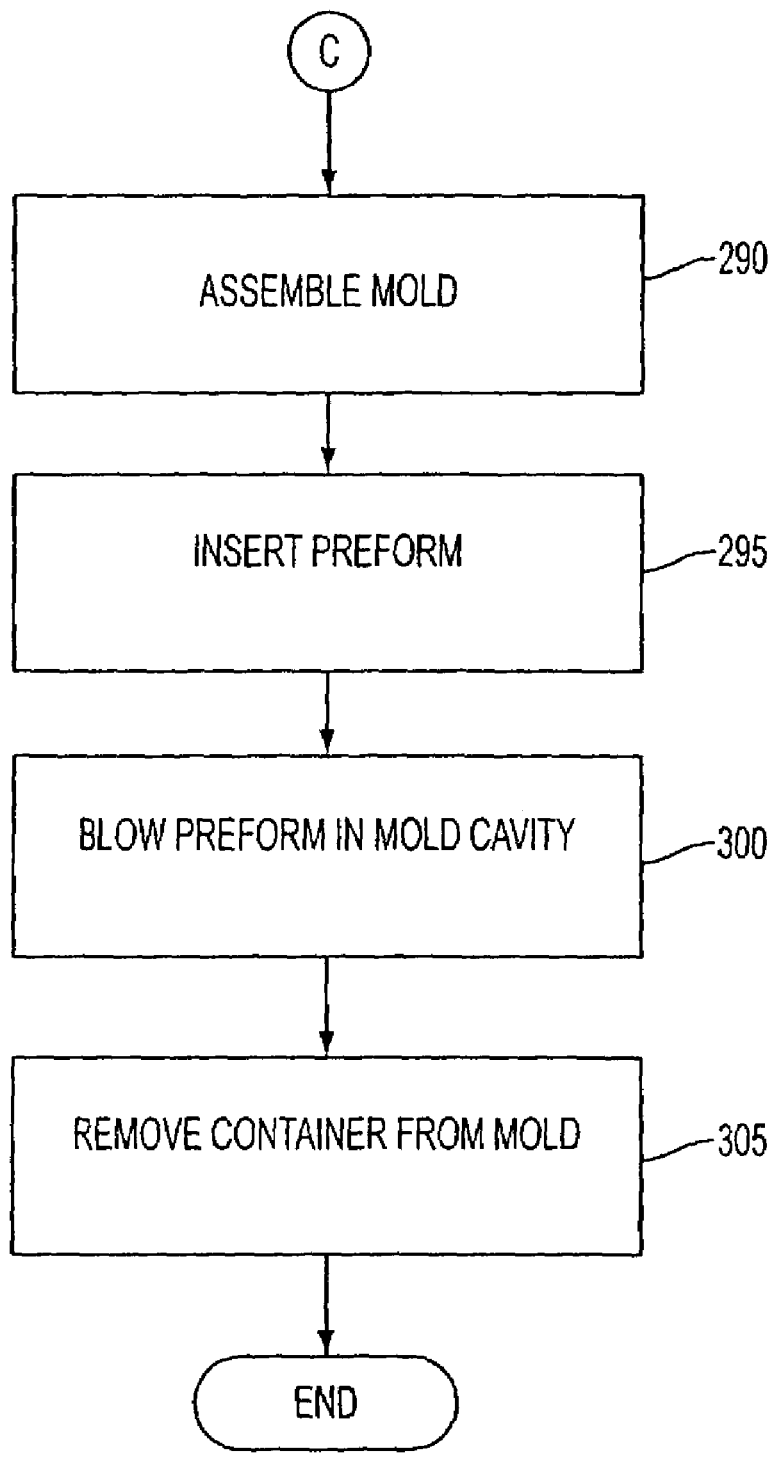
Figure 18:
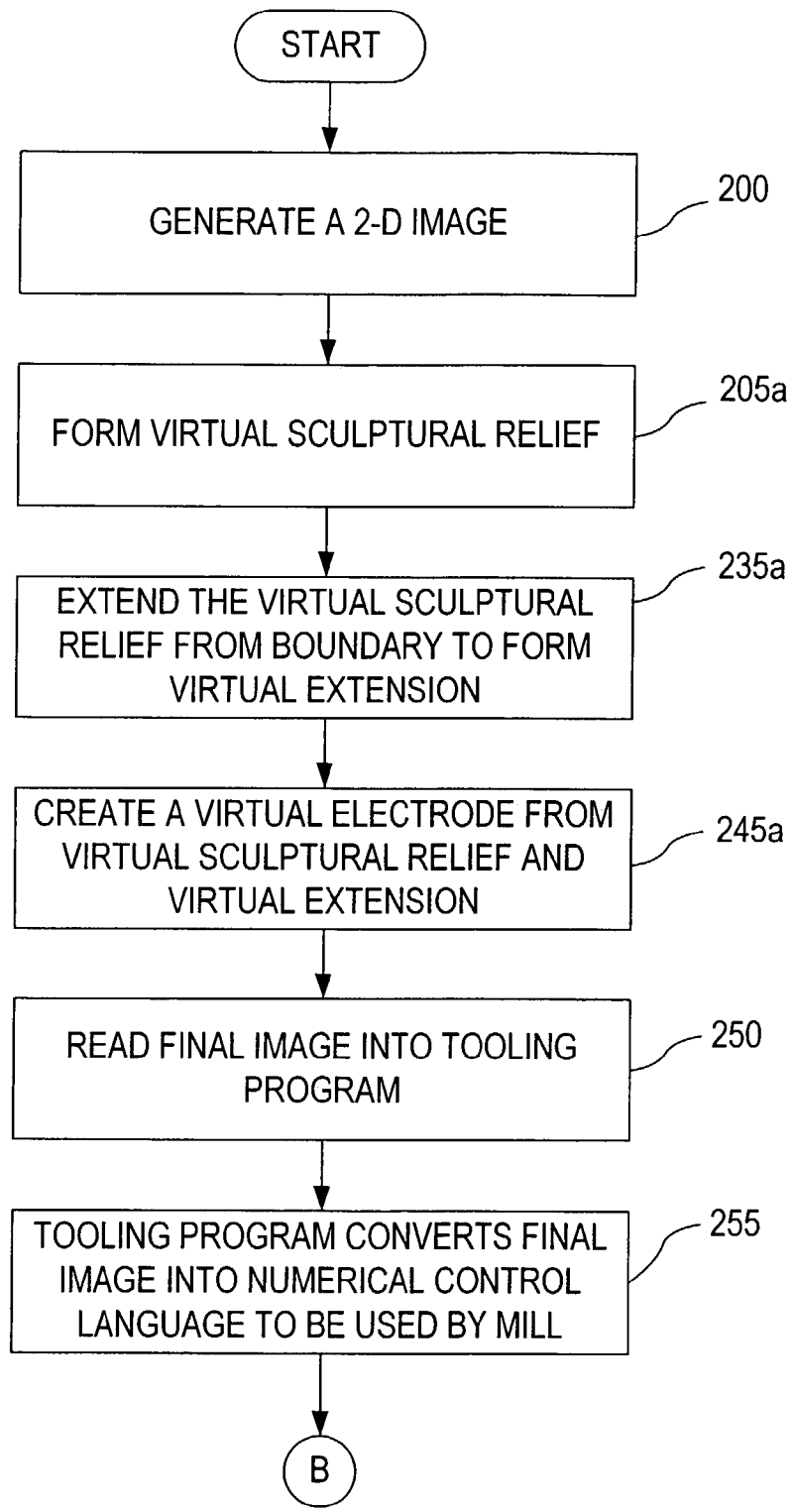
FIG. 18 is a flow chart depicting an exemplary embodiment of the present invention.

FIG. 18 depicts another exemplary embodiment of the present invention illustrating an alternative flowchart to the flowcharts depicted in the exemplary embodiment of FIGS. 6 and 7 collectively. According to an alternative exemplary embodiment of the present invention, a conventional CAD/CAM system can be used to create a CAD model of a virtual sculptural relief. A virtual sculptural relief can begin with a three-dimensional image, or can be created by starting with a two-dimensional image and adding depth to the image in a third dimension. For example, a virtual sculptural relief can be formed using CAD software to place curves in space so as to build relief for a decorative element on a surface of an image. The virtual sculptural relief in an exemplary embodiment can be extended back in accordance with the present invention to create a virtual extension. In one exemplary embodiment, the virtual sculptural relief can be extended back along the perimeter or boundary of the virtual sculptural relief. In one example, the virtual sculptural relief can be extended straight back. In another, the extension can taper inward. The extension can be made, in an exemplary embodiment by extending the boundary of the virtual sculptural relief back into the depth of the relief. In one exemplary embodiment, the surface can be extended straight back behind the outer perimeter of the virtual sculptural relief creating a solid volume behind the surface of the virtual sculptural relief. In another exemplary embodiment, no extension can be created and the boundary or outer perimeter of the surface of the virtual sculptural relief could be used to define an extrusion surface. In other exemplary embodiments, the virtual sculptural relief can be extended back in other manners such as, e.g., in a tapered, or perspective manner to form a cone-like or conical cylindrical extension behind the virtual sculptural relief. For example, an extension need not consume the entire volume directly behind the boundary of the virtual sculptural relief. Various alternative extensions of an image surface can be used as will be apparent to those skilled in the art without parting from the present invention. To create any of these alternative extensions, as will be apparent to those skilled in the relevant art, more or less steps than those outlined in the exemplary flowcharts depicted in the description can be used. For example, the flowchart of FIG. 18, serves as an illustration that, e.g., potentially less steps can be used than detailed in FIGS. 6 and 7 to achieve similar results as the inventions set forth in the claims and their equivalents.

Specifically, in one exemplary embodiment, FIG. 18 begins with step 200 generating a two dimensional image in any conventional CAD/CAM software application program.

The exemplary flowchart of FIG. 18 can continue with step 205*a* to form a virtual sculptural relief from the image by adding depth to the image by extending the image into a third dimension. For example, decorative elements on the surface of the image can be enhanced to build a relief by placing curves or arcs into space using conventional CAD/CAM methods. Any conventional application functions of conventional CAD/CAM software packages can be used to form a virtual sculptural relief from an image.

Next, in step 235 of FIG. 18, in one exemplary embodiment the perimeter boundary of the virtual sculptural relief can be extended to form a virtual extension. In one exemplary embodiment, the surface can be extended straight back. In another exemplary embodiment, the surface can be extended back in a tapered manner, or toward a substantial perspective point or area smaller than the cross sectional area of the perimeter boundary of the virtual sculptural relief. In the alternative, in one exemplary embodiment, the boundary of the perimeter of the virtual sculptural relief could be used without an extension, as a basis for extruding a surface.

FIG. 18, in an exemplary embodiment, can continue with step 245*a* to create a virtual electrode from the virtual surface relief and the extension according to the present invention. In an alternate embodiment, an electrode could be produced directly from the boundary of the perimeter of the virtual sculptural relief.

The flowchart of FIG. 18, in one exemplary embodiment, can then continue with steps 250 and 255 to create the electrode as described above with reference to FIG. 7.

While the invention has been described in detail with reference to specific, exemplary and preferred embodiments, it will be appreciated that various modifications and variations will be apparent to the artisan. All such modifications and embodiments as may occur to one skilled in the art are intended to be within the scope of the appended claims.

What is claimed is:

1. A method in a computer system for generating an image for producing an electrode, comprising:
    generating a virtual sculptural relief;
    projecting the virtual sculptural relief onto a virtual mold cavity surface to form a virtual sculptural relief on the virtual mold cavity surface, the projected virtual sculptural relief having a profile;
    removing the virtual mold cavity surface outside the profile of the virtual projected sculptural relief;
    extending the virtual projected sculptural relief profile to a predetermined plane to form a virtual extension of the virtual projected sculptural relief; and
    combining the virtual projected sculptural relief with the virtual extension, which together form a virtual image of the electrode.

2. The method according to claim 1, further comprising the step of converting the virtual image into a numerical control language.

3. The method according to claim 2, further comprising the step of machining a material based on the numerical control language to form the electrode.

4. The method according to claim 3, wherein the material is graphite.

5. The method according to claim 1, wherein the step of removing the virtual mold cavity surface includes triangulating the virtual projected sculptural relief.

6. The method according to claim 1, wherein the step of extending the virtual projected sculptural relief includes triangulating the virtual extension.

7. The method of claim 1, further comprising the step of displaying the combined virtual projected sculptural relief and virtual extension, which together form the image of the electrode.

8. The method of claim 1, wherein the step of removing the virtual mold cavity surface includes triangulating the virtual projected sculptural relief, and wherein the step of extending the virtual projected sculptural relief includes triangulating the virtual extension.

9. The method of claim 8, further comprising the step of displaying the combined triangulated virtual projected sculptural relief and triangulated virtual extension, which together form the image of the electrode.

10. The method of claim 1, further comprising the step of generating a two-dimensional shape prior to the step of generating the sculptural relief, wherein the sculptural relief is generated based upon the two-dimensional shape.

11. A method for producing an electrode, comprising:
(a) forming a virtual sculptural relief having at least three dimensions, and a perimeter boundary;
(b) creating a virtual electrode from said perimeter boundary of said virtual sculptural relief; and
(c) extending said perimeter boundary of said virtual sculptural relief in a third dimension to form a virtual extension.

12. The method of claim 11, wherein step (a) comprises: (1) generating an image having at least two dimensions; and (2) forming said virtual sculptural relief by adding depth to said image.

13. The method of claim 11, wherein said step (c) comprises: (1) extending said virtual extension straight back behind said perimeter boundary of said virtual sculptural relief.

14. The method of claim 11, wherein said step (c) comprises: (1) extending said virtual extension in a tapered manner behind said perimeter boundary of said virtual sculptural relief.

15. The method of claim 11, wherein said step (c) comprises: (1) extending said virtual extension so a virtual extension volume is less than or equal to a volume created by extending directly back from said perimeter boundary.

16. The method of claim 11, wherein said step (b) comprises: (1) creating said virtual electrode from said perimeter boundary of said virtual sculptural relief and said virtual extension.

17. The method according to claim 11, further comprising: (c) converting said virtual electrode into a numerical control language.

18. The method according to claim 17, further comprising: (d) machining a material based on said numerical control language to form an electrode.

19. The method according to claim 18, wherein said material comprises graphite.

20. A method for producing an electrode, comprising:
(a) forming a virtual sculptural relief having at least three dimensions, and a perimeter boundary; and
(b) creating a virtual electrode from said perimeter boundary of said virtual sculptural relief; and
(c) converting said virtual electrode into a numerical control language.

* * * * *